US012762209B2

(12) United States Patent
You et al.

(10) Patent No.: US 12,762,209 B2
(45) Date of Patent: Oct. 13, 2026

(54) INSUFFICIENT CONTENT DETECTION WITH MACHINE LEARNING ENSEMBLE

(71) Applicant: Palo Alto Networks, Inc., Santa Clara, CA (US)

(72) Inventors: Zeyu You, Santa Clara, CA (US); Wei Wang, Milpitas, CA (US); Jingwei Fan, Chapel Hill, NC (US)

(73) Assignee: Palo Alto Networks, Inc., Santa Clara, CA (US)

( * ) Notice: Subject to any disclaimer, the term of this patent is extended or adjusted under 35 U.S.C. 154(b) by 558 days.

(21) Appl. No.: 18/157,547

(22) Filed: Jan. 20, 2023

(65) Prior Publication Data

US 2024/0248962 A1 Jul. 25, 2024

(51) Int. Cl.

| | |
|---|---|
| ***G06F 16/906*** | (2019.01) |
| ***G06F 16/951*** | (2019.01) |
| ***G06F 18/241*** | (2023.01) |
| ***G06F 21/50*** | (2013.01) |
| ***G06F 40/211*** | (2020.01) |
| ***G06F 40/284*** | (2020.01) |
| ***H04L 67/02*** | (2022.01) |

(52) U.S. Cl.

CPC .......... *G06F 18/241* (2023.01); *G06F 16/906* (2019.01); *G06F 16/951* (2019.01); *G06F 21/50* (2013.01); *G06F 40/211* (2020.01); *G06F 40/284* (2020.01); *H04L 67/02* (2013.01)

(58) Field of Classification Search

CPC ............................. G06F 16/906; G06F 16/951

See application file for complete search history.

(56) References Cited

U.S. PATENT DOCUMENTS

| | | | | |
|---|---|---|---|---|
| 11,100,554 | B1 * | 8/2021 | Gupta ................. | G06F 16/9535 |
| 2007/0005417 | A1 * | 1/2007 | Desikan ............. | G06Q 30/0241 705/14.49 |
| 2013/0159270 | A1 * | 6/2013 | Urmy ................. | G06Q 10/0631 707/706 |
| 2018/0032599 | A1 * | 2/2018 | Larsen .................. | G06F 16/285 |
| 2020/0057858 | A1 * | 2/2020 | Sharma ................. | G06F 21/563 |
| 2020/0134058 | A1 * | 4/2020 | Liu ..................... | G06F 16/2379 |

OTHER PUBLICATIONS

Devlin, et al., "BERT: Pre-training of Deep Bidirectional Transformers for Language Understanding", ArXiv, abs/1810.04805v2, May 24, 2019, 16 pages.

Sanh, et al., "DistilBERT, a distilled version of BERT: smaller, faster, cheaper and lighter", arXiv:1910.01108v4, Mar. 1, 2020, 5 pages.

* cited by examiner

*Primary Examiner* — Apu M Mofiz
*Assistant Examiner* — Dara J Glasser
(74) *Attorney, Agent, or Firm* — Gilliam IP PLLC

(57) ABSTRACT

An insufficient content (IC) detection ensemble comprising a natural language model and a gradient boosting classifier detects IC in HyperText Transfer Protocol (HTTP) responses corresponding to Uniform Resource Locators (URLs). The architecture of the IC detection ensemble is such that the natural language model receives natural language tokens from body elements of HTML code in the HTTP responses as inputs, and the gradient boosting classifier receives count-based feature values and additional feature values extracted from the HTTP responses and outputs from the natural language model to generate IC/non-IC verdicts.

20 Claims, 7 Drawing Sheets

INSUFFICIENT CONTENT DETECTION WITH MACHINE LEARNING ENSEMBLE

BACKGROUND

The disclosure generally relates to CPC class G06F and subclass 21/50 and/or 21/56.

Categorization of content in HyperText Transfer Protocol (HTTP) responses corresponding to Uniform Resource Locators (URLs) provides a strong signal for potential malicious attacks due to certain content categories having high probabilities of being malicious or benign. Moreover, assigning categories to different types of content allows for filtering URLs in a firewall according to custom policies as the URLs are associated with one or more of the categories. Oftentimes, URLs will return content that is not sufficiently descriptive to facilitate accurate categorization. While content at these URLs can be benign (e.g., a soft 404 response for an incorrectly typed URL), non-categorizable content exposes users to potential malicious attacks because the firewall does not have enough information to make an accurate malicious/benign verdict.

BRIEF DESCRIPTION OF THE DRAWINGS

Embodiments of the disclosure may be better understood by referencing the accompanying drawings.

DESCRIPTION

Figure 1:
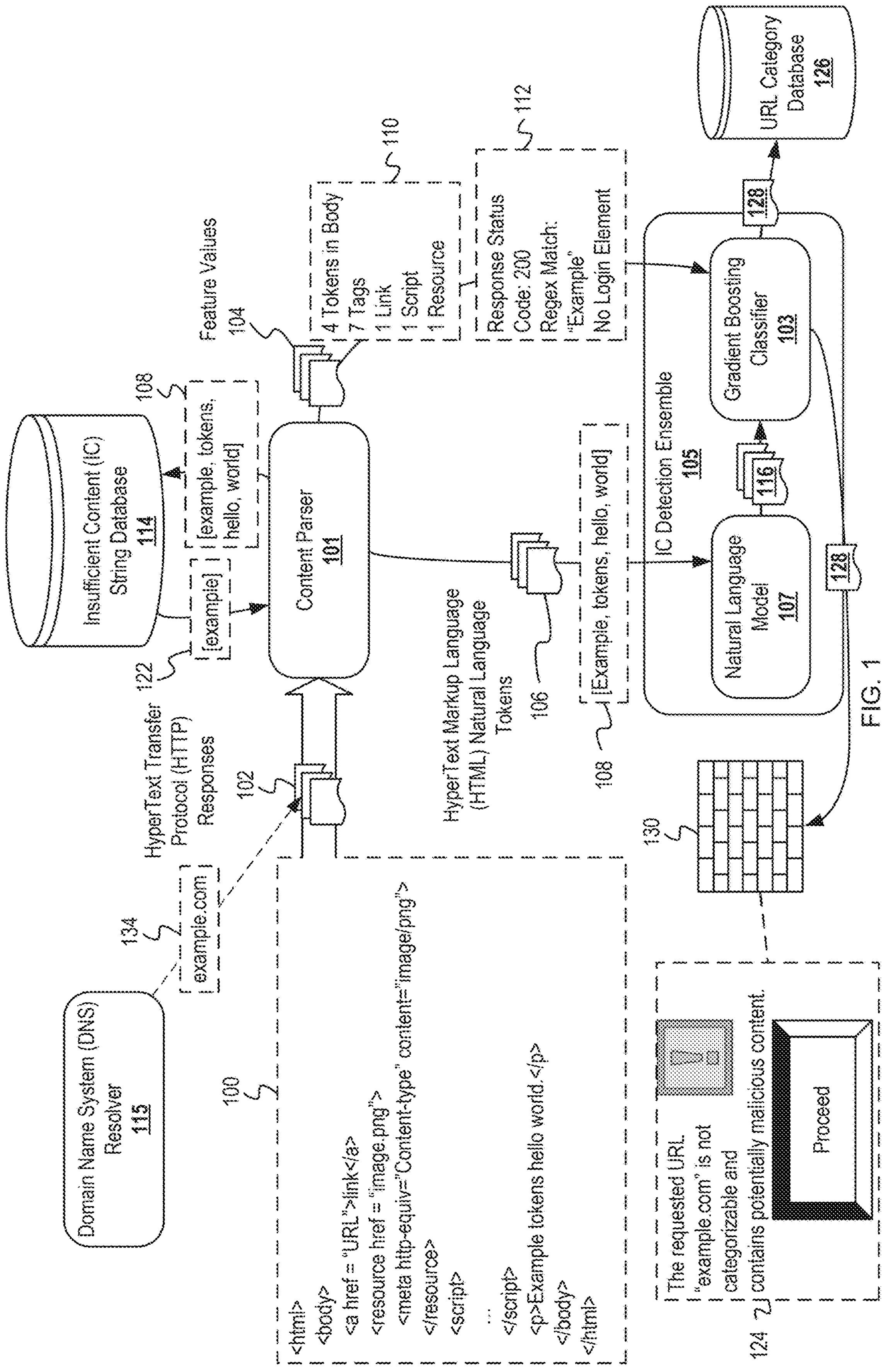
FIG. 1 is a schematic diagram of an example system for detecting insufficient content (IC) from HTTP responses with an IC detection ensemble.

The description that follows includes example systems, methods, techniques, and program flows to aid in understanding the disclosure and not to limit claim scope. Well-known instruction instances, protocols, structures, and techniques have not been shown in detail for conciseness.

Overview

URLs corresponding to insufficient content (IC) are difficult to detect with natural language processing (NLP) because many indicators of IC are not represented in natural language content contained in body element text of HyperText Markup Language (HTML) code returned from the URLs. For instance, IC can be indicated by lack of login forms, lack of tags to links, elements, resources in HTML code, HTTP response status codes, etc. that are not reflected directly in natural language content. Consequently, NLP models can struggle for this classification task. An IC detection ensemble (ensemble) disclosed herein comprises both a natural language model that adapts general language NLP learning to the context of IC detection and a gradient boosting classifier that takes outputs of the natural language model and features engineered for the context of IC as inputs. The engineered features account for the aforementioned indicators and include count-based engineered features that track types and numbers of HTML tags—lower numbers of tags correlate with higher likelihood of IC—and additional features such as the presence of login forms and HTTP response status codes.

The ensemble has an architecture such that the natural language model receives natural language content from body elements of HTML code as inputs and the gradient boosting classifier receives outputs of the natural language model and feature values for the engineered features as inputs. During training of the ensemble, an IC detection ensemble trainer (trainer) crawls training URLs to extract/generate natural language content and feature values for the engineered features from HTTP responses. IC/non-IC labels for each training URL are then updated at each training epoch based on inputting the natural language content/feature values into the ensemble. Once trained, the ensemble is deployed inline and/or in the cloud on a firewall to detect IC URLs queried by one or more endpoint devices. When an IC website is detected, the firewall displays an alert to a user of one of the endpoint devices that indicates the URL and potentially malicious activity due to lack of definitive URL categorization. When IC is not detected, the firewall categorizes URLs with a separate classifier. The combination of a natural language model that makes classifications according to semantic context of natural language content and engineered features that correlate with IC boosts overall confidence of IC detection with the ensemble.

Terminology

Use of the phrase “at least one of” preceding a list with the conjunction “and” should not be treated as an exclusive list and should not be construed as a list of categories with one item from each category, unless specifically stated otherwise. A clause that recites “at least one of A, B, and C” can be infringed with only one of the listed items, multiple of the listed items, and one or more of the items in the list and another item not listed.

“Insufficient content,” “non-categorizable content”, and “incomplete content” are used alternatively herein to refer to content returned in HTTP responses from HTTP requests to a URL that is not categorizable. Content that is not categorizable means that a domain level expert or URL category classifier is not sufficiently confident in assigning a substantive category to the content. For instance, not categorizable content can comprise content that is too sparse for categorization, nonsense, or non-human readable content.

“Content” of a document or HTTP response refers to the principal substance (e.g., principal text or data) of HTTP responses or other documents/data associated with URLs. Content can be structured or unstructured and can be represented in various file formats, data structures, programming languages, human languages, etc. “Natural language content” refers to content that relates to human speech, writing, or other forms of communication according to human languages.

Example Illustrations

FIG. 1 is a schematic diagram of an example system for detecting IC from HTTP responses with an IC detection ensemble. An IC detection ensemble 105 comprising a natural language model 107 and a gradient boosting classifier 103 receives content parsed by a content parser 101 contained in HTTP responses 102. Based on output of the IC detection ensemble 105, the content is classified as insufficient or sufficient and the IC detection ensemble 105 communicates this classification/verdict 128 to a URL category database 126 and a firewall 130. Based on the classification/verdict 128 indicating IC, the firewall 130 performs corrective action such as displaying a warning to a user display at an endpoint device and/or terminating sessions/flows with the URL identified as having IC.

Example HTML code 100 contained in an HTTP response such as the HTTP responses 102 is the following:

```
    <html>
<body>
  <a href = "URL">link</a>
  <resource href = "image.png">
    <meta http-equiv="Content-type" content="image/png">
  </resource>
  <script>
    ...
  </script>
  <p>Example tokens hello world.</p>
</body>
</html>
```

This HTML code comprises a hyperlink tag to "URL" with display text "link", a resource tag that references an image "image.png", a script tag, and a paragraph tag with text "Example tokens hello world." The HTTP responses 102 further comprise a URL for which a corresponding HTTP request was sent such as example URL 134 "example-.com" communicated by a Domain Name System (DNS) resolver 115 prior to DNS resolution. Alternatively, the DNS resolver 115 can communicate the example URL 134 to the firewall 130 and the firewall 130 can associate the example URL 134 with the classification/verdict 128 by the IC detection ensemble 105.

The content parser 101 parses the HTTP responses 102 to extract HTML natural language tokens 106 and generate features values 104. For instance, the content parser 101 can extract the HTML natural language tokens 106 from HTML code in the HTTP responses 102 from inside of paragraph elements, heading elements, title elements, and other HTML elements known to correspond to natural language content with the body element. The content parser 101 can remove syntax of HTML code and/or American Standard Code Information Interchange (ASCII) characters outside a certain range (e.g., non-alphanumeric ASCII characters). For the example HTML code 100, the content parser 101 discards content from all elements except the paragraph element and removes whitespaces, punctuation, and case from the text therein to generate example HTML natural language tokens 108 comprising tokens "example", "tokens", "hello", and "world".

The features values 104 generated by the content parser 101 include values for features: a number of tokens in body element, a number of tags, a number of link tags, a number of script tags, a number of resources tags, an HTTP response status code, a regex and/or signature match, and a login element. For the example HTML code 100, example count feature values 110 generated by the content parser 101 comprise 4 tokens in the body element, 7 tags, 1 link tag, 1 script tag, and 1 resource tag.

Example additional feature values 112 comprise an HTTP response status code 200 (extracted from an HTTP response that included the example HTML code 100), a regex match of the token "example" and no login element. For the regex match feature, the content parser communicates tokens in the HTTP responses 102 to an IC string database 114. The IC string database 114 searches for matching tokens and returns matching tokens corresponding to IC to the content parser 101. For the example HTML code 100, the content parser 101 communicates tokens in the example HTML natural language tokens 108 to the IC string database 114 and the IC string database 114 returns example matching token 122 "example" that the content parser 101 then includes as a regex match feature value. Alternatively, the content parser 101 can communicate all HTML code in the HTTP responses 102, and the IC string database 114 can do a substring search in the HTML code against stored strings. The IC string database 114 can alternatively comprise signatures for IC content and the matching of the HTML code can comprise a signature match.

When generating the login element feature value, the content parser 101 determines whether there are any login form elements in HTML code from the HTTP responses 102. For the example HTML code 100, the content parser 101 determines that no such login form element is present. The content parser 101 stores the login element feature value as a 1 indicating a login element is present and 0 otherwise—the representation of the login element feature value as "No Login Element" in the example additional feature values 112 is for illustrative purposes.

The content parser 101 communicates the HTML natural language tokens 106 and the feature values 104 to the IC detection ensemble 105. The IC detection ensemble 105 preprocesses the HTML natural language tokens 106 with NLP (e.g., by generating numerical embedding vectors for each token using word2vec) and preprocesses the feature values 104 by converting string feature values into numerical feature values using NLP. The IC detection ensemble 105 can perform additional preprocessing steps such as normalization of numerical feature vectors. After preprocessing, the IC detection ensemble 105 inputs the HTML natural language tokens 106 into the natural language model 107 and inputs the feature values 104 and output 116 of the natural language model 107 to the gradient boosting classifier 103. The natural language model 107 and gradient boosting classifier 103 have architectures that are configured to accept variably sized inputs, for instance when the amount of natural language content and number of regex substring matches from the HTTP responses 102 varies.

Example models for the natural language model 107 and the gradient boosting classifier 103 include distillBERT and XGBoost, respectively, although any natural language model and classifier configured to receive the respective inputs of each model can be used. The natural language model 107 was previously trained on natural language tasks using a variety of natural language content representative of a broader scope than IC and then was further trained on natural language tokens extracted from IC/non-IC HTTP responses to transfer the general natural language content learning to the context of IC. For instance, the broader scope natural language content used to train the natural language model 107 can comprise tokens extracted from literature, technical documents, encyclopedia entries, etc. (e.g., the WikiText language modeling dataset) on the magnitude of millions or billions of tokens.

The output 116 of the natural language model 107 comprises one or more likelihood values that the HTML natural language tokens 106 correspond to IC. The classification/verdict 128 of the gradient boosting classifier 103 comprises a likelihood value that the HTTP responses 102 comprise IC, and the IC detection ensemble 105 adds an identifier of the URL ("example.com") that communicated the HTTP responses 102 to the classification/verdict 128.

The URL category database 126 receives and stores the classification/verdict 128 as an indexed pair of URL and corresponding IC/non-IC classification. The firewall 130 performs corrective action such as displaying example user warning 124 to a user at an endpoint device. The example user warning 124 comprises the following:

The requested URL "example.com" is not categorizable and contains potentially malicious content.

Additionally, the example user warning 124 comprises a button that prompts the user as to whether they want to proceed to the URL. Corrective action performed by the firewall 130 can vary according to additional analysis for the URL indicated in the classification/verdict 128. For instance, the firewall 130 can analyze the HTTP responses 102 and other user traffic associated with the URL against behavioral signatures to detect abnormal behavior. When abnormal behavior is detected, the firewall 130 can determine a severity level based on associated applications, exposure levels of associated endpoint devices, etc. For higher severity levels, the firewall 130 can terminate all sessions/flows associated with the URL and/or all user traffic at the endpoint device and can indicate a warning to the user reflecting corrective action that was taken.

Although not depicted in FIG. 1, the HTTP responses 102 is detected by the firewall 130 in traffic communicated to an endpoint device to the Internet. The firewall 130 can be running inline (e.g., by generating pcap files from the user) or in the cloud. Additionally, the firewall 130 can be monitoring multiple sessions/flows associated with multiple URLs and applications, can maintain a list of URLs associated with active sessions/flows, and, based on detecting sessions/flows associated with a new URL, can communicate the HTTP responses 102 associated with the new URL to the content parser 101. New URLs can be communicated to the firewall 130 by the DNS resolver 115 in association with their external IP address so as to track HTTP responses for the new URLs. Prior to communicating the HTTP responses 102 to the content parser 101 and subsequent to detecting the new URL, the firewall 130 can query the URL category database 126 to determine whether the new URL has previously been classified for IC. Based on the URL category database 126 returning an IC/non-IC classification/verdict, the firewall 130 can forego communicating the HTTP responses 102 to the content parser 101 for classification and can perform corrective action based on the returned classification. Additionally, when the classification/verdict 128 indicates the URL as non-IC, the firewall 130 can perform additional analysis such as determining a category of the URL and associated risk levels.

Feature values 104 generated by the content parser 101 are described as corresponding to "count-based features" and "additional features". These can be any features generated from content returned responsive to a request to a URL. The count-based features are counts of HTML tags and/or elements in HTML code. The count-based features can alternatively comprise other HTML structure features such as features that quantify nested tags, Document Object Model (DOM) features, etc. The additional features comprise header features generated from header fields in HTTP responses and HTML features generated from HTML code in HTTP responses. The additional features can further include other features generated from content in HTTP responses such as JavaScript code features, redirect features, HTML header features, HTML body features, etc.

Figure 2:
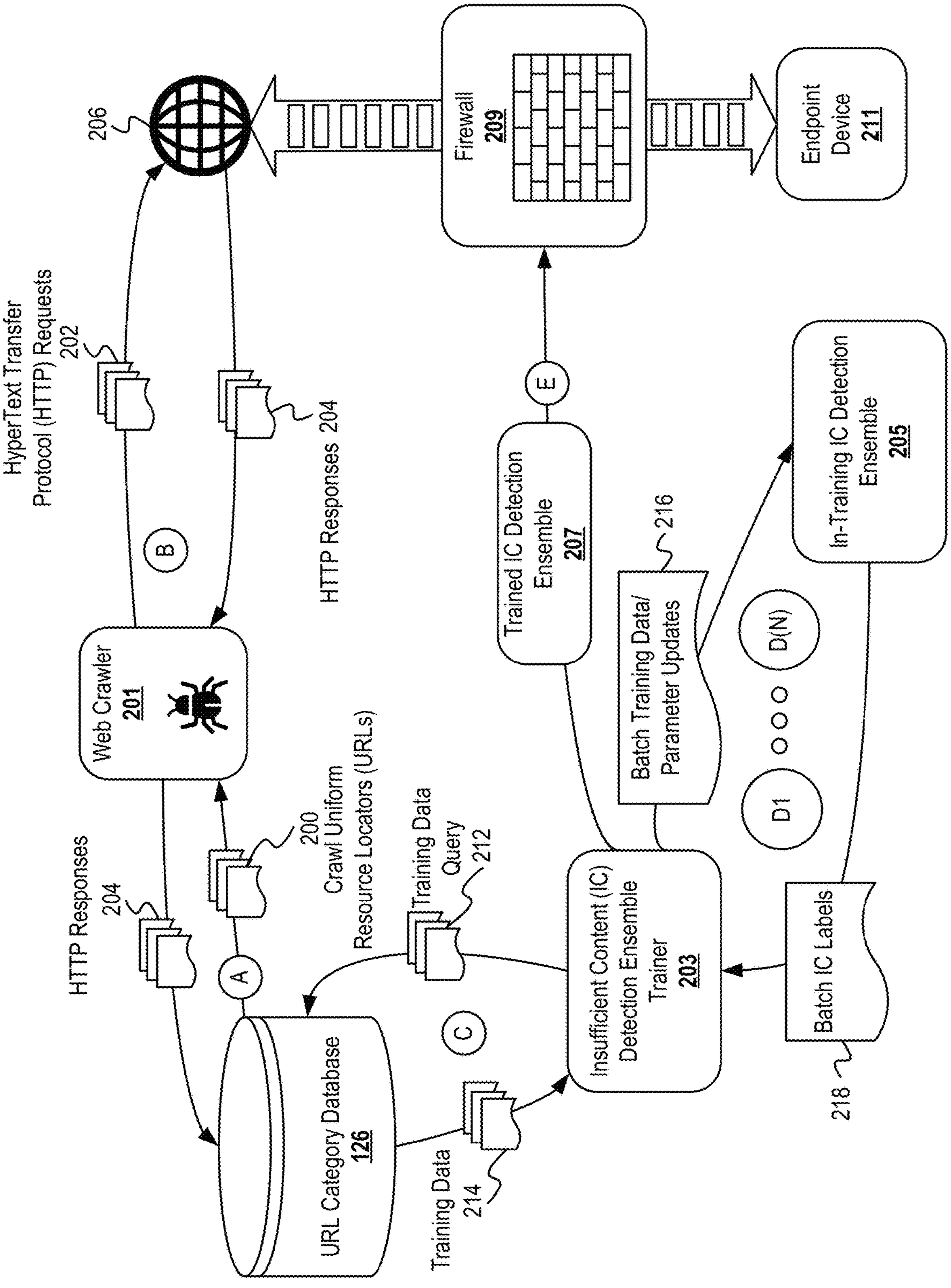
FIG. 2 is a schematic diagram of an example system for training an IC detection ensemble.

FIG. 2 is a schematic diagram of an example system for training an IC detection ensemble. An IC detection ensemble trainer (trainer) 203 trains an in-training IC detection ensemble (in-training ensemble) 205 using HTTP responses crawled from the Internet 206. Subsequently, a trained detection ensemble 207 is deployed on a firewall 209 monitoring traffic between an endpoint device 211 and the Internet 206. FIG. 2 is annotated with a series of numbers/letters A-C, D1-DN, and E. Each stage represents one or more operations. Although these stages are ordered for this example, the stages illustrate one example to aid in understanding this disclosure and should not be used to limit the claims. Subject matter falling within the scope of the claims can vary from what is illustrated. For instance, URLs can be crawled and recrawled before, during, and/or after training of the in-training ensemble 205.

At stage A, the URL category database 126 communicates crawl URLs 200 to a web crawler 201. The URL category database 126 stores URLs that have previously been crawled for IC detection and/or IC detection ensemble training and associated categories. The URL category database 126 determines which of the stored URLs need to be crawled/recrawled. For instance, the URL category database 126 can store a date of most recent crawl/recrawl for each previously crawled URL and can include all URLs with a crawl/recrawl date prior to a given date (e.g., one week ago) in the crawl URLs 200. Alternatively, based on an indication that an IC detection ensemble is to be trained, the URL category database 126 can include every stored URL in the crawl URLs 200.

The categories stored in the URL category database 126 comprise categories predicted by classification models and are continuously updated/changed based on user feedback. Prior to training, users can indicate to a corresponding service (e.g., a web server) that URLs are incorrectly categorized and can suggest alternative categories. The URL category database 126 receives the user feedback and determines whether to change URL categories, for instance based on whether a threshold number of users have suggested a same alternative category. The URL category database 126 (or other data lake not depicted in FIG. 2) additionally stores HTTP responses associated with previously crawled URLs. In some embodiments, when the number of crawled URLs leads to an unmanageable amount of data in the HTTP responses, the URL category database 126 can delete data for certain URLs, for instance by only keeping data for certain parent domains and deleting data for their subdomains. Note that the URL category database 126 can label URLs with any number of categories when the URLs are non-IC and for the purposes of training and deploying the in-training ensemble 205, all categories of URLs that do not comprise the IC category are converted to the non-IC category (this operation can be performed by any of the various components depicted in FIG. 2).

At stage B, the web crawler 201 adds the crawl URLs 200 to its selection policy, communicates HTTP requests 202 corresponding to the crawl URLs 200 to the Internet 206, receives HTTP responses 204 in response, and communicates the HTTP responses 204 to the URL category database 126. The URL category database 126 stores the HTTP responses 204 in association with corresponding ones of the crawl URLs 200. According to its politeness policy and selection policy the web crawler 201 can intersperse crawling the crawl URLs 200 with other URLs already present in the selection policy. The web crawler 201 communicates HTTP responses 204 as it receives them for HTTP responses corresponding to the crawl URLs 200.

At stage C, the trainer 203 communicates a training data query 212 to the URL category database 126. The training data query 212 can comprise an indication that training is about to occur (e.g., according to an API of the URL category database 126) and the URL category database 126 can store a set of URLs and corresponding HTTP responses and IC/non-IC labels in a memory partition as training data. Alternatively, the training data query 212 can indicate URLs for which training data is requested. For training URLs with no IC/non-IC labels, the URL category database 126 can communicate these non-labelled URLs to a domain-level expert (not depicted) for manual labelling, a separate URL category classifier (also not depicted), or some combination thereof for label generation. The URL category classifier and/or domain-level expert can output labels from any number of categories and the URL category database 126 can convert the labels to IC when the category is IC and non-IC for every other category. The trainer 203 aggregates training data 214 according to the training data query 212 and communicates the training data 214 to the trainer 203.

At stages D1-DN, the trainer 203 trains the in-training ensemble 205 in epochs and batches within each epoch. Prior to training, the trainer 203 initializes internal parameters of the in-training ensemble 205. The in-training ensemble 205 comprises a natural language model and a gradient boosting classifier (e.g., as depicted above in reference to FIG. 1). The natural language model receives inputs comprising natural language tokens from body elements of HTML code in HTTP responses of the training data 214. The gradient boosting classifier receives count-based feature values, additional feature values, and outputs of the natural language model as inputs. The trainer 203 parses HTTP responses in the training data 214 to generate the natural language tokens, count-based feature values, and additional feature values. The natural language model can be pretrained on natural language tokens representative of a broader scope than IC and can be trained on the natural language tokens extracted from the training data 214 for the task of IC detection prior to training the in-training ensemble 205. In some embodiments, for instance when the natural language model and gradient boosting classifier are neural networks, loss determined at each batch of the training data 214 can be propagated through the layers of both neural networks. In other embodiments, only the gradient boosting classifier is trained subsequent to pre-training of the natural language model.

At each batch within each epoch, the trainer 203 communicates batch training data/parameter updates 216 to the in-training ensemble 205. The in-training ensemble 205 updates its internal parameters according to the parameter updates and inputs the batch training data to generate batch IC labels 218 which the in-training ensemble 205 communicates to the trainer 203. The trainer 203 then computes a loss function on differences between the batch IC labels 218 and ground-truth IC/non-IC labels from the training data 214 to determine parameter updates for the next batch. Additionally, after each epoch, the trainer 203 can input all of the feature values and natural language tokens into the in-training ensemble 205 to generate updated/higher accuracy labels for the next epoch. Batches can be sampled uniformly at random from the training data 214 with a batch size that depends on the amount of training data 214 (e.g., 10% of the training URLs). Training continues until training termination criteria are satisfied such as that a threshold number of epochs has occurred, that training, testing, and/or validation losses are sufficiently low, that internal parameters of the in-training ensemble 205 converge across batches and epochs, etc.

At stage E, a trained IC detection ensemble 207 is deployed at the firewall 209 to monitor communications between the endpoint device 211 and the Internet 206. The firewall 209 can be deployed inline at the endpoint device 211 or deployed in the cloud. The firewall 209 can be in communication with a DNS resolver (not depicted) for the endpoint device 211 configured to forward URLs requested by a user of the endpoint device 211 to the firewall 209. Alternatively, the firewall 209 can detect URLs from reverse DNS lookups of external IP addresses logged in user traffic. The firewall 209 can maintain a list of URLs associated with active sessions/flows, and when a new URL is detected, the firewall 209 inputs feature values and natural language tokens generated from an HTTP response corresponding the new URL into the trained IC detection ensemble 207. Accordingly, the firewall 209 can remove URLs from the list of active sessions/flows as all sessions/flows for a URL are terminated/torn down. The firewall 209 performs corrective action based on IC/non-IC verdicts by the trained IC detection ensemble 207 on HTTP responses from the new URLs.

Figure 3:
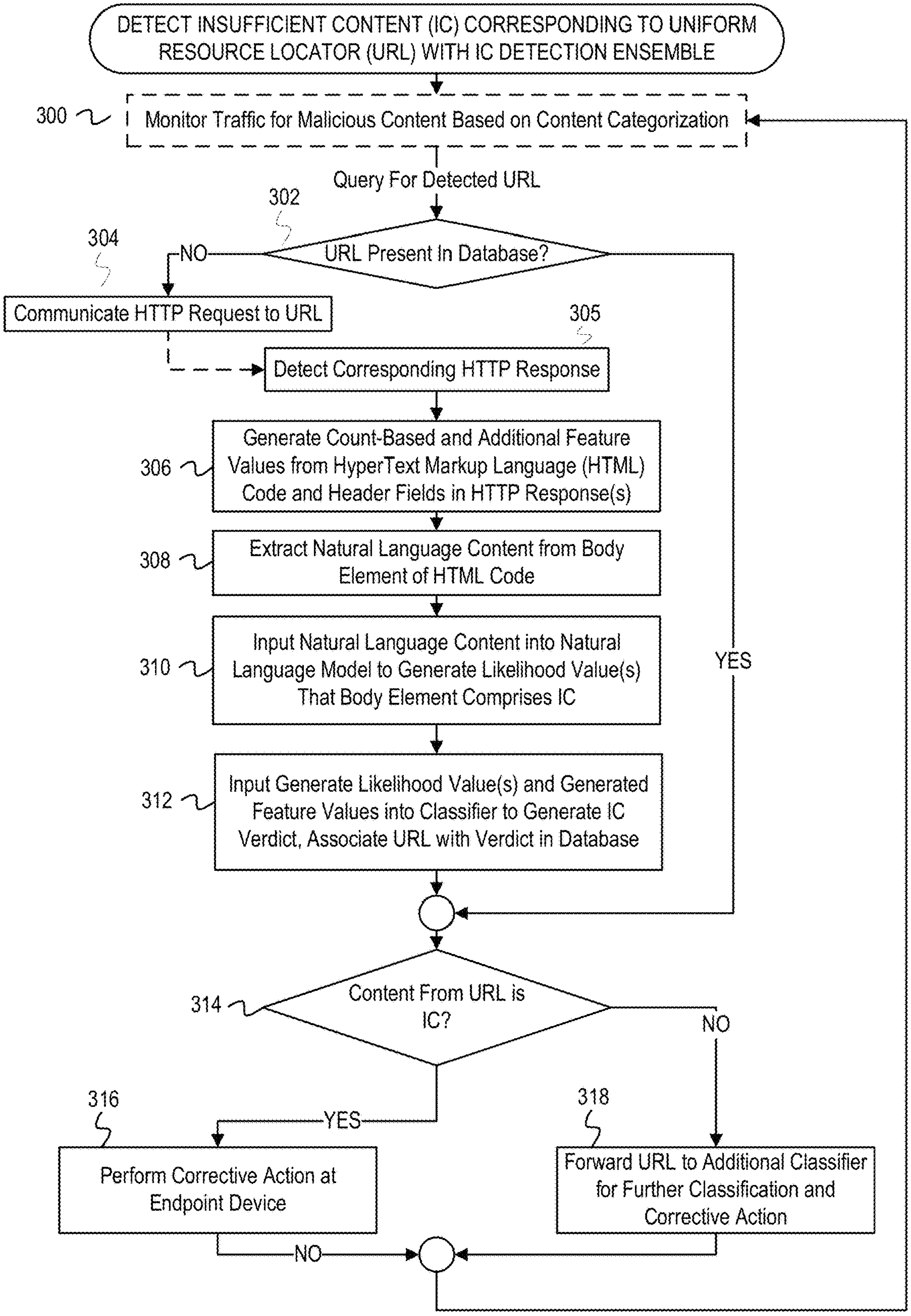
FIG. 3 is a flowchart of example operations for detecting IC corresponding to a URL with an IC detection ensemble.
Figure 4:
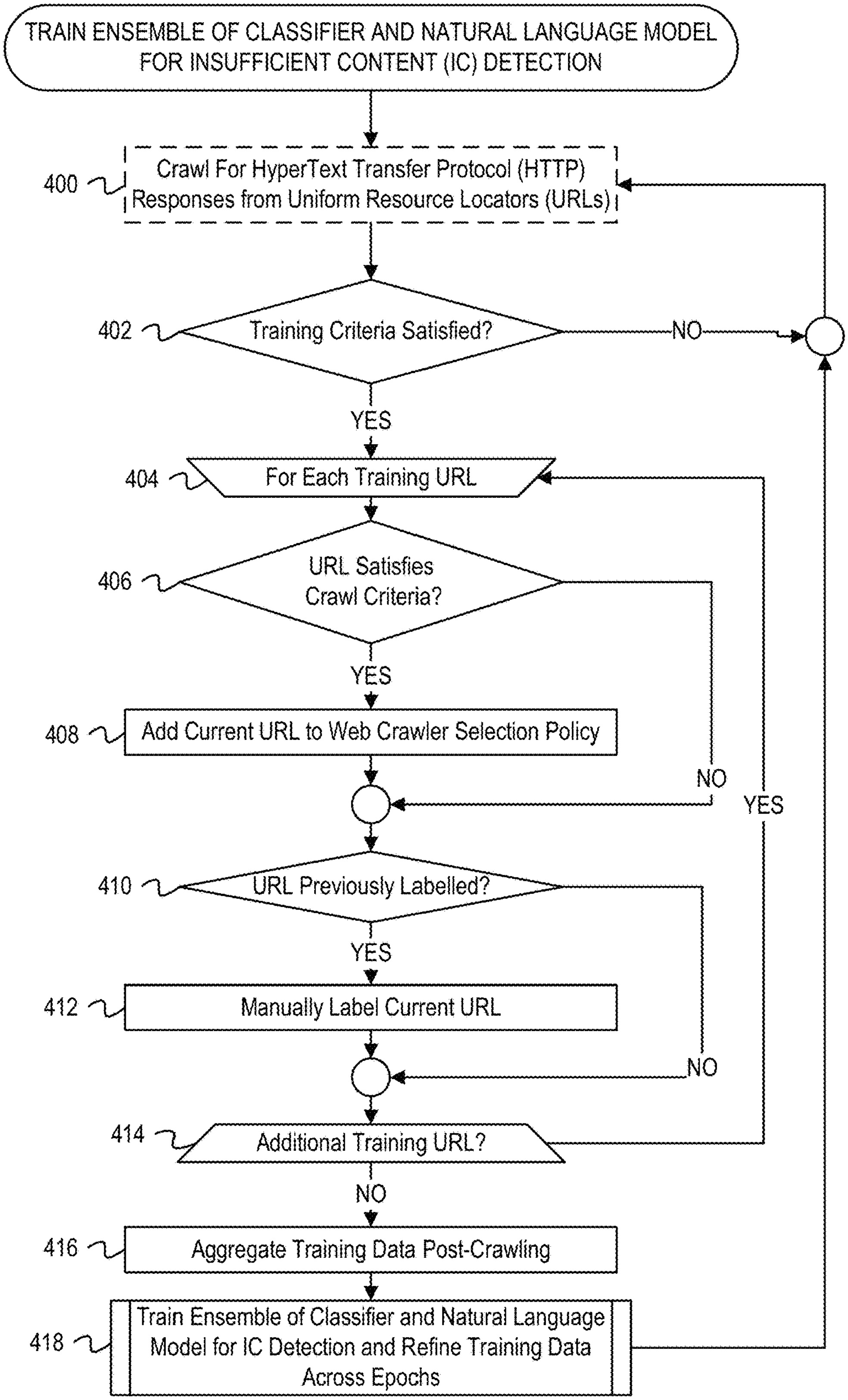
FIG. 4 is a flowchart of example operations for training an ensemble of a classifier and a natural language model for IC detection.
Figure 5:
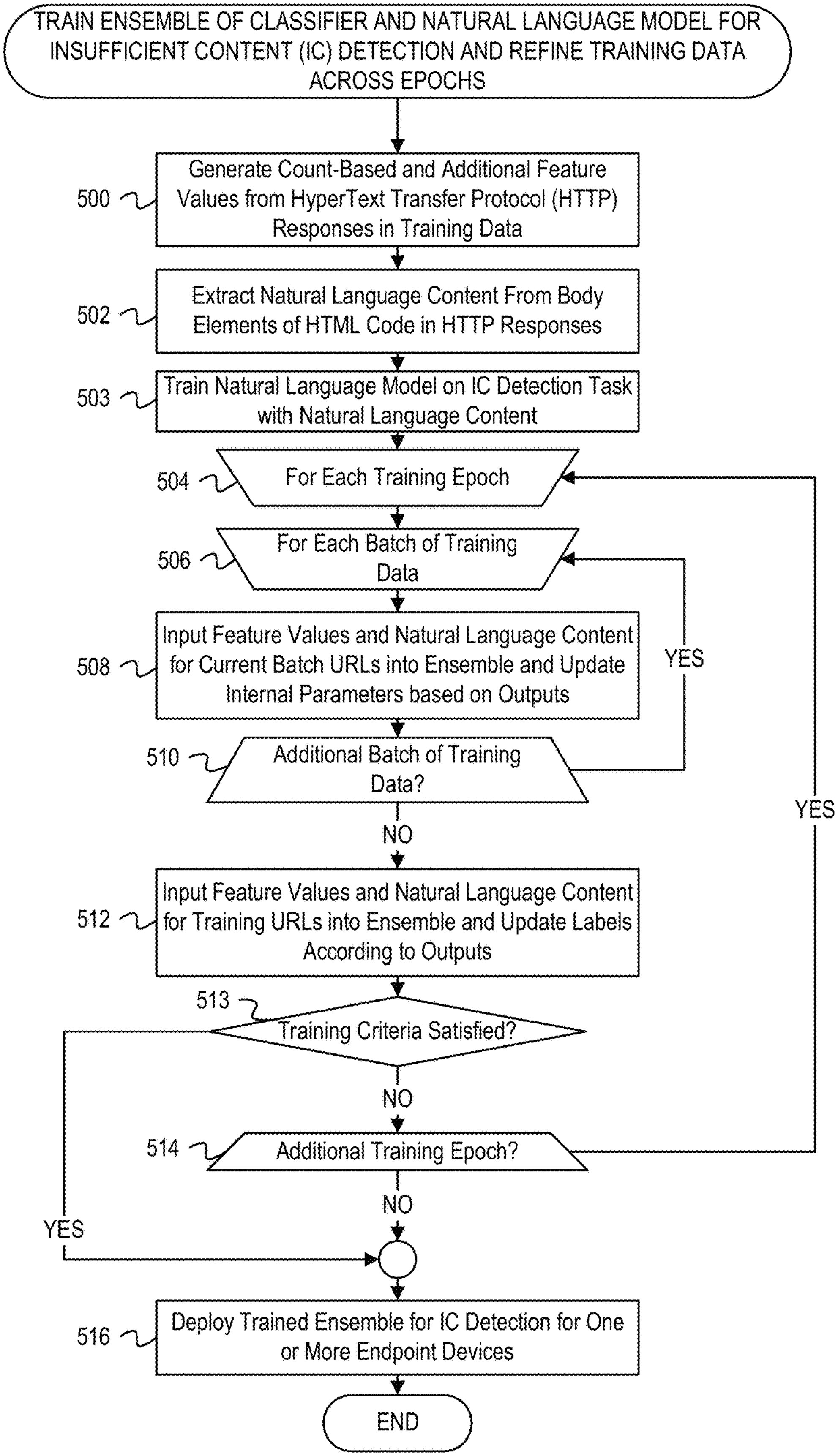
FIG. 5 is a flowchart of example operations for training an ensemble of a classifier and a natural language model for IC detection and refining training data across epochs.

FIGS. 3-5 are flowcharts of example operations for detecting IC corresponding to URLs with a machine learning ensemble and training a machine learning model for IC detection. The example operations are described with reference to an IC detection ensemble (ensemble), a firewall, a URL category database, and an IC detection ensemble trainer (trainer), and a web crawler for consistency with the earlier figure(s) and/or ease of understanding. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

FIG. 3 is a flowchart of example operations for detecting IC corresponding to a URL with an IC detection ensemble (ensemble). At block 300, a firewall monitors traffic (e.g., HTTP traffic) to determine a category for corresponding content and handle accordingly. If the firewall detects a user request in user traffic for content from a URL, the firewall queries a URL category database (database) with an identifier of the URL. The firewall is deployed inline or in the cloud to monitor user traffic at one or more endpoint devices. The firewall detects the user request in the user traffic by detecting URLs indicated in the user traffic prior to DNS resolution of the URLs to external Internet Protocol (IP) addresses, for instance by receiving the URL from a DNS resolver prior to resolution. The DNS resolver can be configured to communicate all detected URLs or URLs not present in its cache to the firewall. In some embodiments, rather than detecting URLs the firewall detects external IP addresses (for instance, external IP addresses logged in capture files) and performs a reverse DNS lookup to determine the corresponding URLs. The firewall can maintain a list or other data structure of URLs and/or IP addresses associated with active sessions/flows for the user, can add new URLs and/or IP addresses to the list, and can remove URLs and/or IP addresses from the list as associated sessions/flows are terminated/torn down. In addition to the subsequent operations in FIG. 3 when new URLs and/or IP addresses are detected, the firewall maintains one or more security policies and monitors the user traffic for abnormal behavior, for instance by using behavioral signatures associated with applications, URLs, IP addresses, etc. Block 300 is depicted with dashed lines to indicate that the operations at block 300 occur continuously and in parallel to the remaining blocks in FIG. 3 until an external entity intervenes (e.g., an administrator updating security policies at the one or more endpoint devices).

At block 302, the database searches for the queried URL. In some embodiments, the database can additionally determine whether the queried URL has been classified for IC within a recent time frame, and if not can also determine that the URL is not present in the database. If the queried URL is not present in the database, flow proceeds to block 304. Otherwise, flow skips to block 314.

At block 304, the firewall communicates an HTTP request to the URL. The HTTP request can be an HTTP request corresponding to the URL detected in monitored user traffic by the firewall or can be an additional HTTP request communicated by the firewall in response to detecting the user request to the URL. Accordingly, the HTTP request can be communicated by the firewall or by a user endpoint device. For the latter case, the firewall allows flows/sessions in the user traffic to the URL while logging capture files and categorizing the URL.

At block 305, the firewall detects a response corresponding to the HTTP request previously communicated. It is expected that numerous flows are traversing the firewall and the firewall monitors each flow individually or at least maintains some extent of state information for each flow that facilitates association of respective requests and responses. A dashed line is depicted from block 304 to block 305 since the flow is asynchronous.

At block 306, the ensemble generates count-based and additional feature values from HTML code and header fields in the HTTP response(s). Count-based features can comprise a number of tokens within body elements, a number of tags, a number of link tags, a number of script tags, and a number of resource tags. The additional features can comprise an HTTP response status code, strings in the HTTP response(s) that regex match IC-associated strings or strings that match IC signatures, and an indicator of whether there is a login element. The ensemble further converts any string feature values to numerical feature values using NLP and can perform additional normalization steps such as fitting features within certain intervals or with certain probability distributions.

At block 308, the ensemble extracts natural language content from the body element of the HTML code. The ensemble discards elements from the body element of the HTML code known to not correspond to natural language content. The ensemble then removes HTML syntax and ASCII characters outside a range of codes (e.g., non-alphanumeric ASCII characters) and extracts consecutive sequences of characters within the range of codes as tokens.

At block 310, the ensemble inputs the natural language content into a natural language model to generate a likelihood value(s) that the body element comprises IC. The natural language model was previously trained on one or more natural language tasks with natural language tokens representative of a broader scope than IC—in some instances millions or billions of tokens—and was further trained for the task of IC detection on IC/non-IC labelled tokens. For instance, the natural language model can be a distillBERT or Bidirectional Encoder Representations from Transformers (BERT) model.

At block 312, the ensemble inputs the generated likelihood value(s) and generated feature values into a classifier to generate an IC verdict and associates the URL with the verdict in the database. For instance, the classifier can be a gradient boosting model or other boosting model that augments the predictions of the natural language model (i.e., the generated likelihood value(s)) with the generated feature values. The database can further store the verdict in association with the URL, content in an HTTP response from the URL, and/or a time stamp for when the IC verdict was generated in any appropriate data structure/database structure.

At block 314, if content returned from the URL is IC according to the verdict generated by the ensemble, flow proceeds to block 316. Otherwise, flow proceeds to block 318.

At block 316, the firewall performs corrective action at the endpoint device. For instance, the firewall can indicate an alert to a user at the endpoint device that includes the requested URL and a description of IC as well as possible risks associated with accessing content from IC websites. Depending on severity of associated applications, the firewall can further terminate sessions/flows corresponding to the URL pending user or administrator approval. Flow returns to block 300.

At block 318, the firewall forwards the URL to an additional classifier for further classification and corrective action. The additional classifier can be configured to identify severity levels based on categories indicated in a classification of the URL. The corrective action can also comprise user alerts and/or session/flow termination based on associated classifications and maliciousness verdicts. Flow returns to block 300.

FIG. 4 is a flowchart of example operations for training an ensemble of a classifier and a natural language model for IC detection. At block 400, a web crawler crawls for HTTP responses from URLs. The web crawler communicates returned HTTP responses to a URL category database (database) for storage prior to training an IC detection model. In some instances, when a large volume of URLs is crawled which leads to a volume of HTTP responses exceeding available storage space, HTTP responses can be deleted from the database. For instance, old HTTP responses or HTTP responses for subdomains can be deleted. Block 400 is depicted with a dashed line to indicate that the operations at block 400 occur continuously in parallel with the remaining operations depicted in FIG. 4. The web crawler continues to populate its selection policy and crawl/recrawl URLs according to the selection policy until external intervention terminates web crawling.

At block 402, an IC detection ensemble trainer (trainer) determines whether training criteria are satisfied. The training criteria can be that a threshold amount of time has elapsed since an IC detection ensemble (ensemble) has been trained, that a sufficient amount of training data has been crawled, that IC detection is required at one or more endpoint devices, any combination thereof, etc. If the trainer determines that the criteria are satisfied, the trainer communicates to the database a request for training data, and flow proceeds to block 404. Otherwise, flow returns to block 400.

At block 404, the database iterates through training URLs in the training data set. Example operations at each iteration are depicted at blocks 406, 408, 410, and 412.

At block 406, the database determines whether the current URL satisfies crawl criteria. The crawl criteria can comprise whether the current URL has been previously crawled and/or how recently the current URL has been crawled. If the crawl criteria are satisfied, flow proceeds to block 408. Otherwise, flow skips to block 410.

At block 408, the database communicates the current URL to the web crawler to add to its selection policy. Note that the web crawler continuously crawls the Internet according to its selection policy and may crawl for an HTTP response and communicate the HTTP response to the database in parallel with the iterations through training URLs in FIG. 4.

At block 410, the database determines whether the current URL was previously labelled. URLs in the training URLs can be previously labelled by users accessing a service with URL categories. The users can query the service for a category of a URL, and when the URL is either not previously categorized by the service or incorrectly categorized by the service the user can suggest a category for the URL. In addition or alternatively, URLs can be previously labelled by a URL category classifier provided the confidence of the classification is sufficiently high. Note that the URLs labelled by users or classifier can be labels for any number of categories. Conversely, for the operations in FIG. 4, the database converts the labels into an IC label if the labelled category is IC, and a non-IC label if the label is any category besides IC. Operations for user labelling of URL categories are depicted in greater detail in reference to FIG. 6. If the current URL was previously labelled, flow proceeds to block 412. Otherwise, flow skips to block 414.

At block 412, the database manually labels the URL. For instance, the database can communicate with a domain-level expert who labels the current URL according to domain knowledge of the current URL. Alternatively, the database can communicate the current URL to an existing IC detection model for labelling. Note that while the operations at block 412 are depicted as occurring during a single iteration through training URLs, the current URL can be manually labelled in parallel with other training URLs as HTTP responses for the current URL are received by the web crawler.

At block 414, the database continues iterating through the training URLs. If there is an additional training URL in the iterations, flow returns to block 404. Otherwise, flow proceeds to block 416.

At block 416, the database receives HTTP responses to URL crawls from the web crawler and, once each of the crawled HTTP responses for training data is received, aggregates the training data. The training data comprises HTTP responses and corresponding IC/non-IC labels. The training data can additionally comprise the training URLs such that these URLs can be associated with IC/non-IC verdicts post training.

At block 418, a trainer trains an ensemble of a classifier and a natural language model for IC detection and refines the training data across epochs. The operations at block 418 are depicted in greater detail with reference to FIG. 5. Flow returns to block 400.

FIG. 5 is a flowchart of example operations for training an ensemble of a classifier and a natural language model for IC detection and refining training data across epochs. At block 500, an IC detection ensemble trainer (trainer) generates count-based and additional feature values from HTTP responses in training data. The count-based features can be based on HTML code in the HTTP responses and comprise a number of tokens in body elements, a number of tags, a number of link tags, a number of script tags, and a number of resource tags. The additional features can comprise an HTTP response status code, strings in HTML code that match IC-related strings and/or signatures, and indications of login elements in HTML code. The trainer further converts string feature values to numerical feature values using NLP and can perform additional normalization/preprocessing steps.

At block 502, the trainer extracts natural language content from body elements of HTML code in the HTTP responses. The trainer discards HTML elements with types known to not correspond with natural language content and parses the remaining elements to remove HTML code/punctuation/white spaces to extract tokens of natural language content. The trainer further converts the tokens to numerical vectors with NLP.

At block 503, the trainer trains a natural language model of the ensemble on the task of detecting IC with the natural language content. The natural language model was previously trained on natural language content comprising, in some embodiments, millions or billions of tokens to perform one or more natural language tasks. Thus, the trainer refines the natural language model to the context of IC detection using the natural language content extracted from HTTP responses and IC/non-IC labels during training. Training parameters of the natural language model depend on the type/architecture of the natural language model and the amount of natural language content extracted from the HTTP responses.

At block 504, the trainer iterates through training epochs. The number of training epoch iterations can depend on architecture of the ensemble (e.g., number of internal parameters), amount of available training data/computing resources, desired training time/model accuracy, etc.

At block 506, the trainer iterates through batches of training data. The batches can be sampled uniformly at random from the training data and the size of each batch can depend on the amount of training data (e.g., 10% of the available training data).

At block 508, the trainer inputs the feature values and natural language content for current batch URLs into the ensemble and updates internal parameters based on the outputs. The architecture of the ensemble is such that the natural language content is input to the natural language model and the feature values and a likelihood value(s) output by the natural language model are input to a classifier (e.g., a gradient boosting classifier such as XGBoost). Internal parameters of the classifier are then updated according to a loss function between IC/non-IC labels output by the classifier and ground-truth labels in the training data for the current batch URLs. In some embodiments, for instance when the classifier and natural language model are neural networks, the loss of the classifier is backpropagated through both the classifier and the natural language model.

At block 510, the trainer continues iterating through batches of training data. If there is another batch of training data, flow returns to block 506. Otherwise, flow proceeds to block 512.

At block 512, trainer inputs feature values and natural language content for each of the training URLs into the ensemble and updates the labels based on the outputs. This process refines the quality of the labels according to the most recent training of the ensemble from the previous epoch. In some embodiments, this step is omitted to prevent over-biasing the ensemble towards its own predictions during training resulting in a positive reinforcement cycle of bad labels.

At block 513, the trainer determines whether training criteria are satisfied. The training criteria can comprise that internal parameters of the ensemble are stabilizing across epochs/batches, that training, testing, and/or validation errors are sufficiently low, etc. If the training criteria are satisfied, flow skip to block 516. Otherwise, flow proceeds to block 514.

At block 514, the trainer continues iterating through training epochs. If there is an additional training epoch, flow returns to block 504. Otherwise, flow proceeds to block 516.

At block 516, the trainer deploys the trained ensemble for IC detection for one or more endpoint devices. For instance, the trained ensemble can be deployed at an inline or cloud-based firewall that monitors user traffic at the one or more endpoints and based on IC/non-IC verdicts by the trained ensemble, performs corrective action accordingly.

Figure 6:
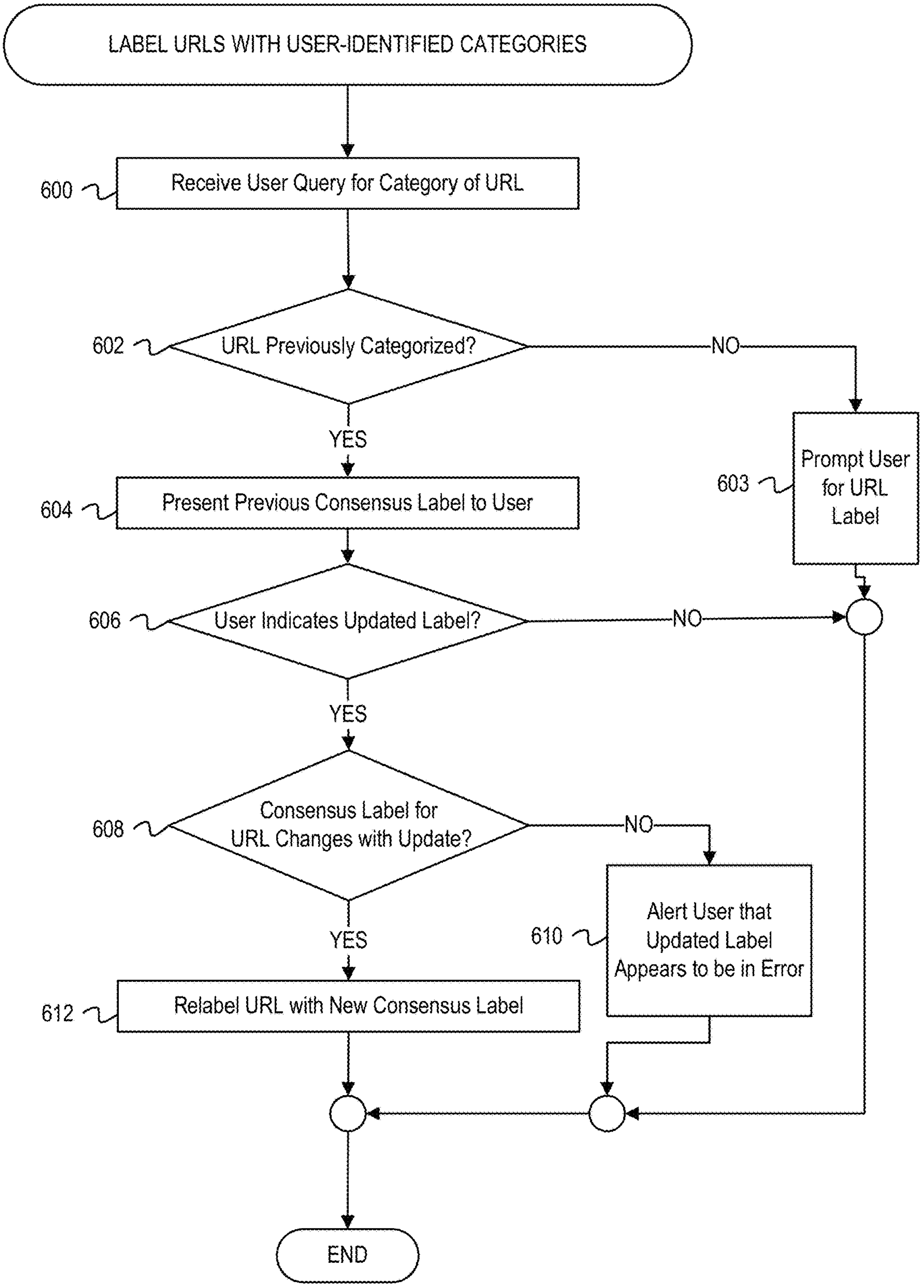
FIG. 6 is a flowchart of example operations for labelling URLs with user-identified categories.

FIG. 6 is a flowchart of example operations for labelling URLs with user-identified categories. Note that the operations relate to labelling of URLs according to any number of categories whereas labels in the foregoing refer to IC/non-IC category labels. At block 600, a service receives a user query for a category of a URL. The service can be a web service, a local service running on an endpoint device (e.g., a firewall), a cloud-based service, etc.

At block 602, the service determines whether the URL was previously categorized. If the URL was previously categorized, flow proceeds to block 604. Otherwise, flow proceeds to block 603.

At block 603, the service prompts the user for a label of the URL. The service then, in response to a category indicated by the user, stores the URL in associated with the labelled category in a URL category database. The flow in FIG. 6 terminates.

At block 604, the service presents a previous consensus label of the URL to the user. The previous consensus label of the URL can be a consensus label according to previously applied labels by other users of the service. Additionally or alternatively, the consensus label can comprise output of a URL category classifier. Confidence of outputs by this URL category classifier can be weighted with confidence of the previous user labels when determining the label.

At block 606, the service determines whether the user indicates an updated label for the URL. If the user indicates an updated label for the URL, flow proceeds to block 608. Otherwise, the service adds the user label to the consensus label for the URL and the flow in FIG. 6 terminates.

At block 608, the service determines whether the consensus URL changes according to the updated label by the user. The service can add the user's label to previous labels of the URL and can determine whether the consensus user label changes. Additionally, the service can weight the updated consensus label against outputs and confidence of outputs from the URL content classifier. If the consensus label of the URL changes, flow proceeds block 612. Otherwise, flow proceeds to block 610.

At block 610, the service alerts the user that the label appears to be updated in error. The service can further indicate avenues of escalation for the user such as messaging an administrator or cybersecurity expert regarding the user-proposed label. The flow in FIG. 6 terminates.

At block 612, the service relabels the URL with the new consensus label and stores the updated URL/label pair in the URL category database. The flow in FIG. 6 terminates.

Variations

The foregoing disclosure refers to an IC detection ensemble with an architecture including a natural language model, a gradient boosting classifier, and count-based feature values, additional feature values, and natural language content for inputting to the IC detection ensemble. The natural language model receives the natural language content as inputs. The gradient boosting classifier receives outputs of the natural language model and feature values as inputs. Other architectures are possible to implement the disclosed technology. For instance, the gradient boosting classifier can alternatively be any classifier effective for combining the feature values and outputs of the natural language model. The features can vary with respect to feature engineering, NLP for converting string feature values to numerical feature values, feature normalization/preprocessing, etc. The gradient boosting classifier can receive a subset of or transformation of outputs of the natural language model as inputs. Any natural language model that is proficient for extracting semantic information from natural language content can be implemented.

Content and feature values are described variously in the foregoing as being extracted/generated from HTTP responses. In other embodiments, content and feature values can be extracted from data represented in packets to and from an endpoint device according to other Internet protocols. For instance, HyperText Transfer Protocol Secure (HTTPS) responses, packet capture files, etc. can be analyzed and parsed to generate feature values and content according to various cloud and/or inline implementations of IC detection ensembles and firewalls.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations in FIG. 4 for crawling training URLs can be performed in parallel or concurrently. With respect to FIG. 3, communicating an HTTP request to the URL is not necessary when the HTTP response is detected by the firewall in user traffic. It will be understood that each block of the flowchart illustrations and/or block diagrams, and combinations of blocks in the flowchart illustrations and/or block diagrams, can be implemented by program code. The program code may be provided to a processor of a general-purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine-readable medium(s) may be utilized. The machine-readable medium may be a machine-readable signal medium or a machine-readable storage medium. A machine-readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain or store a program for use by or in connection with an instruction execution system, apparatus, or device. A machine-readable storage medium is not a machine-readable signal medium.

A machine-readable signal medium may include a propagated data signal with machine-readable program code embodied therein, for example, in baseband or as part of a carrier wave. Such a propagated signal may take any of a variety of forms, including, but not limited to, electro-magnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device.

Program code embodied on a machine-readable medium may be transmitted using any appropriate medium, including but not limited to wireless, wireline, optical fiber cable, RF, etc., or any suitable combination of the foregoing.

The program code/instructions may also be stored in a machine-readable medium that can direct a machine to function in a particular manner, such that the instructions stored in the machine-readable medium produce an article of manufacture including instructions which implement the function/act specified in the flowchart and/or block diagram block or blocks.

Figure 7:
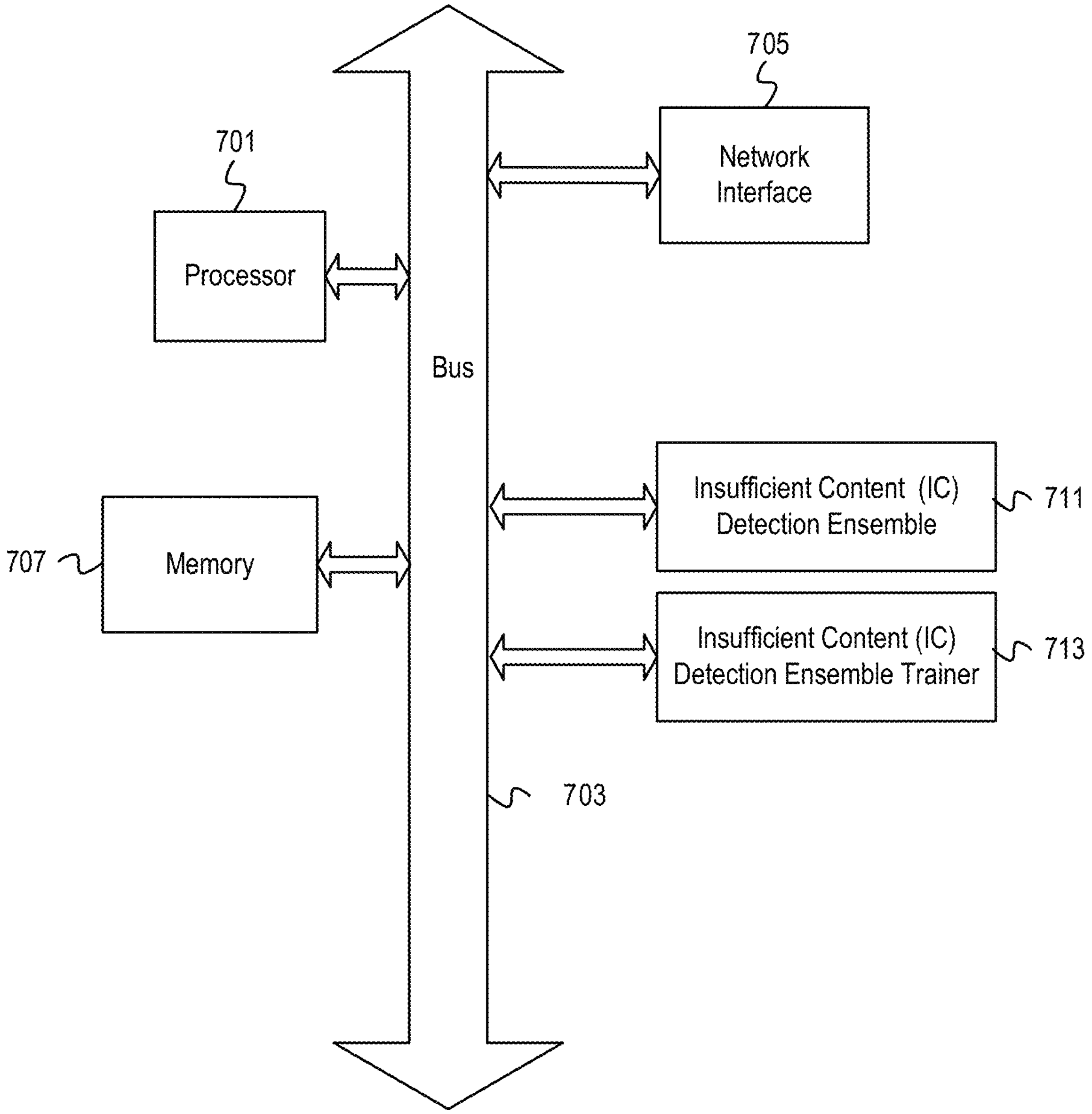
FIG. 7 depicts an example computer system with an IC detection ensemble and an IC detection ensemble trainer.

FIG. 7 depicts an example computer system with an IC detection ensemble and an IC detection ensemble trainer. The computer system includes a processor 701 (possibly including multiple processors, multiple cores, multiple nodes, and/or implementing multi-threading, etc.). The computer system includes memory 707. The memory 707 may be system memory or any one or more of the above already described possible realizations of machine-readable media. The computer system also includes a bus 703 and a network interface 705. The system also includes an IC detection ensemble (ensemble) 711 and an IC detection ensemble trainer (trainer) 713. The ensemble 711 comprises a machine-learning ensemble of a natural language model adapted to the context of IC detection and a gradient boosting classifier that detects IC from HTTP responses using both natural language content and features engineered for IC detection. The trainer 713 generates training data for training IC detection ensembles such as the ensemble 711 by crawling URLs for HTTP responses and labelling the URLs with user-suggested labels (e.g., via a web service) or using a separate URL category classifier. Any one of the previously described functionalities may be partially (or entirely) implemented in hardware and/or on the processor 701. For example, the functionality may be implemented with an application specific integrated circuit, in logic implemented in the processor 701, in a co-processor on a peripheral device or card, etc. Further, realizations may include fewer or additional components not illustrated in FIG. 7 (e.g., video cards, audio cards, additional network interfaces, peripheral devices, etc.). The processor 701 and the network interface 705 are coupled to the bus 703. Although illustrated as being coupled to the bus 703, the memory 707 may be coupled to the processor 701.

The invention claimed is:

1. A method comprising:

extracting content from one or more HyperText Transfer Protocol (HTTP) responses based on HTTP requests to a first Uniform Resource Locator (URL);

inputting the content into a natural language model to generate first one or more likelihood values that a webpage corresponding to the first URL comprises insufficient content;

generating a plurality of feature values based, at least in part, on the one or more HTTP responses, wherein the plurality of feature values comprises first values of one or more count-based features in the content and second values of one or more additional features, wherein the second values of the one or more additional features comprise at least one of values of fields extracted from the one or more HTTP responses and indications of one or more login forms in the one or more HTTP responses;

inputting the plurality of feature values and the first one or more likelihood values into a first classifier to obtain a second likelihood value that the webpage corresponding to the first URL comprises insufficient content as output, wherein the first classifier was trained as an ensemble with the natural language model to output augment predictions of the natural language model with feature values of the one or more count-based features and the one or more additional features when predicting whether URLs correspond to insufficient content; and indicating the first URL as corresponding to insufficient content based, at least in part, on the second likelihood value.

2. The method of claim 1, wherein extracting content from the one or more HTTP responses comprises, for each HTTP response of the one or more HTTP responses, extracting HyperText Markup Language (HTML) code from the HTTP response; and removing syntax from the HTML code that does not correspond to natural language content.

3. The method of claim 1, wherein the natural language model was previously trained on natural language content from at least a plurality of documents representative of natural language with a broader scope than insufficient content.

4. The method of claim 1, wherein generating the plurality of feature values comprises at least two of:

generating one or more of the plurality of feature values as a number of tokens in the content;

generating one or more of the plurality of feature values as a number of tags in the content;

generating one or more of the plurality of feature values as a number of resources in the content;

generating one or more of the plurality of feature values as a number of scripts in the content;

generating one or more of the plurality of feature values as an indicator of a login form in the content;

generating one or more of the plurality of feature values as an indicator of an HTTP response status code communicated in the one or more HTTP responses; and generating one or more of the plurality of feature values as a number of string matches of strings in the content to a plurality of strings associated with insufficient content.

5. The method of claim 1, wherein the one or more HTTP responses are responsive to an HTTP request corresponding to the first URL.

6. The method of claim 1, further comprising, based on a third likelihood value output from the first classifier being sufficiently low, indicating the first URL as not corresponding to insufficient content; and forwarding indications of the first URL to a second classifier for further classification.

7. The method of claim 1, wherein the first classifier comprises a gradient boosting classifier.

8. A non-transitory machine-readable medium having program code stored thereon, the program code comprising instructions to:

crawl a first plurality of Uniform Resource Locators (URLs) to obtain a plurality of HyperText Transfer Protocol (HTTP) responses;

parse each of the plurality of HTTP responses to generate plurality of feature values and natural language content, wherein the plurality of feature values comprises first values of one or more count-based features in the natural language content and second values of one or more additional features, wherein the second values of the one or more additional features comprise at least one of values of fields extracted from the plurality of HTTP responses and indications of one or more login forms in the plurality of HTTP responses; and train an ensemble of a natural language model and a classifier to predict whether each of the first plurality of URLs corresponds to incomplete content, wherein the natural language model takes the natural language content as input and the classifier takes outputs of the natural language model and the plurality of feature values as inputs, wherein the natural language model is trained as an ensemble with the classifier to augment predictions by the natural language model using feature values of the one or more count-based features and the one or more additional features.

9. The non-transitory machine-readable medium of claim 8, wherein the program code to parse each of the plurality of HTTP responses to generate natural language content comprise instructions to, for each HTTP response of the plurality of HTTP responses:

extract HyperText Markup Language (HTML) code from the HTTP response; and remove syntax from the HTML code that does not correspond to natural language content.

10. The non-transitory machine-readable medium of claim 8, wherein the natural language model was previously trained on natural language content from at least a plurality of documents representative of natural language with a broader scope than incomplete content.

11. The non-transitory machine-readable medium of claim 8, wherein the program code to train the ensemble of the natural language model and the classifier comprises instructions to refine labels of the plurality of HTTP responses.

12. The non-transitory machine-readable medium of claim 11, wherein the program code to refine labels of the plurality of HTTP responses comprises instructions to:

generate an initial plurality of labels for the plurality of HTTP responses; and for each of a plurality of training epochs and a current plurality of labels at each training epoch initialized as the initial plurality of labels, train the ensemble on the current plurality of labels; and update the current plurality of labels according to outputs of the trained ensemble based on inputting the plurality of feature values and the natural language content for the plurality of HTTP responses.

13. The non-transitory machine-readable medium of claim 8, wherein the instructions to generate the plurality of feature values comprise instructions to at least two of:

generate one or more of the plurality of feature values as a number of tags in the natural language content;

generate one or more of the plurality of feature values as a number of resources in the natural language content;

generate one or more of the plurality of feature values as a number of scripts in the natural language content;

generate one or more of the plurality of feature values as an indicator of a login form in the natural language content;

generate one or more of the plurality of feature values as an indicator of an HTTP response status code communicated in the one or more HTTP responses; and generate one or more of the plurality of feature values as a number of string matches of strings in the natural language content to a plurality of strings associated with insufficient content.

14. The non-transitory machine-readable medium of claim 8, wherein the classifier comprises a gradient boosting classifier.

15. An apparatus comprising:

a processor; and a machine-readable medium having instructions stored thereon that are executable by the processor to cause the apparatus to, communicate a HyperText Transfer Protocol (HTTP) request for a first Uniform Resource Locator (URL);

generate a plurality of feature values from an HTTP response returned responsive to the HTTP request, wherein the plurality of feature values comprises first values of one or more count-based features of content in the HTTP response and second values of one or more additional features, wherein the second values of the one or more additional features comprise at least one of values of fields extracted from the HTTP response and indications of one or more login forms in the HTTP response;

input the plurality of feature values into an ensemble of a natural language model and a first classifier, wherein first inputs to the natural language model comprise a first subset of the plurality of feature values, wherein second inputs to the first classifier comprise outputs of the natural language model from inputting the first inputs and a second subset of the plurality of feature values, wherein the first classifier was trained as an ensemble with the natural language model to augment predictions of the natural language model with feature values of the one or more count-based features and the one or more additional features when predicting whether URLs correspond to insufficient content; and indicate the first URL as corresponding to non-categorizable content based, at least in part, on one or more outputs of the ensemble from inputting the plurality of feature values.

16. The apparatus of claim 15, wherein the plurality of feature values generated from the HTTP response comprise natural language content, wherein the instructions to input the plurality of feature values in the ensemble of the natural language model and the first classifier comprise instructions executable by the processor to cause the apparatus to input the natural language content into the natural language model.

17. The apparatus of claim 16, wherein the natural language model was previously trained on natural language content from at least a plurality of documents representative of natural language with a broader scope than non-categorizable content.

18. The apparatus of claim 15, further comprises instructions executable by the processor to cause the apparatus to:

indicate the first URL as not corresponding to non-categorizable content based, at least in part, on outputs of the ensemble from inputting the plurality of feature values; and communicate indications of the first URL to a second classifier for further classification.

19. The apparatus of claim 15, wherein the instructions to generate the second subset of the plurality of feature values comprise instructions executable by the processor to cause the apparatus to at least two of:

generate one or more of the plurality of feature values as a number of tokens in the content;

generate one or more of the plurality of feature values as a number of tags in the content;

generate one or more of the plurality of feature values as a number of resources in the content;

generate one or more of the plurality of feature values as a number of scripts in the content;

generate one or more of the plurality of feature values as an indicator of a login form in the content;

generate one or more of the plurality of feature values as an indicator of an HTTP response status code communicated in the one or more HTTP responses; and generate one or more of the plurality of feature values as a number of string matches of strings in the content to a plurality of strings associated with insufficient content.

20. The apparatus of claim 15, wherein the first classifier comprises a gradient boosting classifier.

* * * * *